UNITED STATES PATENT OFFICE.

EDUARD JALOWETZ, EMIL RICHTER, AND ALBERT SCHUECKHER, OF VIENNA, AUSTRIA-HUNGARY.

PROCESS FOR IMPROVING WATER FOR BREWING AND MALTING PURPOSES.

1,172,998.  Specification of Letters Patent.  Patented Feb. 22, 1916.

No Drawing.  Application filed November 7, 1912. Serial No. 730,013.

*To all whom it may concern:*

Be it known that we, EDUARD JALOWETZ, EMIL RICHTER, and ALBERT SCHUECKHER, subjects of the Emperor of Austria-Hungary, residing at Vienna, Austria-Hungary, have invented new and useful Improvements in Processes for Improving Water for Brewing and Malting Purposes, of which the following is a specification.

The object of the application Serial No. 671,925 is a process for improving water for brewing and malting purposes by a thorough separation from carbonates of alkaline earths, effected by heating the water under pressure and then separating from the precipitates by filtration or decanting. The process is preferably carried out so that the water is heated and simultaneously given an eddy motion in a closed and incompletely filled tank.

Further improvements of the process according to the application Serial No. 671,925 have established that the separation from the carbonates of alkaline earths exercising injurious action in various respects as brewing and malting water ingredients, also can be effected in a satisfactory manner by heating in an open tank, that is to say, without the application of pressure, if care is taken to bring about a simultaneous strong movement of the water. By this treatment, not only carbonate of lime but more particularly carbonate of magnesia are precipitated in a much greater quantity than would be the case during the ordinary boiling of water in an open tank.

The thorough agitation and intermingling of all of the smallest particles of water, which is necessary for an efficient operation of the process, may be effected either by direct mixing of the heating steam with the water whereby the water is simultaneously heated and given a vigorous agitation by the whirling movements caused by the entering steam, or by means of mechanical stirring devices (mixing wheels, stirrers, &c.) or by combined action of steam and mechanical stirring devices.

For the purpose of purifying industrial waters, containing not too many carbonates, particularly those of magnesium, this method has the advantage, compared with the process according to the application Serial No. 671,925 that it enables a simpler apparatus to be used, and moreover, there is the possibility of using exhaust steam instead of live steam for heating the water.

Having thus described the invention what we claim is:

1. The process of purifying water which comprises heating the water in a container open to the atmosphere and simultaneously vigorously agitating all the particles thereof to cause a precipitation of carbonates throughout all of the particles of said water, and removing the precipitate from said water.

2. The herein described process of purifying water for brewing purposes which comprises heating the water in an open container and simultaneously vigorously agitating all the particles thereof to precipitate substantially all the calcium and magnesium carbonates in said water, and immediately removing the precipitate from the water.

PROF. EDUARD JALOWETZ.
INGENIEUR EMIL RICHTER.
ALBERT SCHUECKHER.

Witnesses:
JOSEPH C. STADLER,
AUGUST FUGGER.

Copies of this patent may be obtained for five cents each, by addressing the "Commissioner of Patents, Washington, D. C."